(12) United States Patent
Ebner et al.

(10) Patent No.: US 6,387,461 B1
(45) Date of Patent: *May 14, 2002

(54) OXYGEN SCAVENGER COMPOSITIONS

(75) Inventors: Cynthia Louise Ebner, Greer, SC (US); John Scott Hallock, Potomac, MD (US)

(73) Assignee: Cryovac, Inc., Duncan, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/306,400

(22) Filed: May 6, 1999

(51) Int. Cl.$^7$ .............................................. B32B 27/08
(52) U.S. Cl. ................ 428/35.7; 428/457; 252/188.28; 206/524.6
(58) Field of Search .................... 428/35.7; 252/188.28, 252/188.21, 188.22, 188.23; 206/524.6

(56) References Cited

U.S. PATENT DOCUMENTS

| | | | |
|---|---|---|---|
| 2,825,651 A | * 4/1958 | Loo et al. ...................... 99/171 |
| 4,360,120 A | 11/1982 | Samuel et al. ............... 524/494 |
| 4,368,828 A | 1/1983 | Samuel et al. ............ 220/81 R |
| 4,619,848 A | 10/1986 | Knight et al. .................. 428/35 |
| 5,014,447 A | 5/1991 | Hagen .......................... 34/156 |
| 5,507,980 A | 4/1996 | Kelkar et al. ................. 264/15 |
| 5,518,704 A | 5/1996 | Kelkar et al. ............ 423/420.2 |
| 5,941,037 A | 8/1999 | Hallock et al. ................ 52/407 |
| 6,007,885 A | * 12/1999 | Hallock ..................... 428/35.7 |
| 6,228,284 B1 | * 5/2001 | Ebner et al. ........... 252/188.28 |

FOREIGN PATENT DOCUMENTS

| | | |
|---|---|---|
| EP | 0 129 309 | 12/1984 |
| EP | 0 182 674 | 5/1986 |
| GB | 1112023 | 5/1968 |
| GB | 1112024 | 5/1968 |
| GB | 1112025 | 5/1968 |
| GB | 2084601 | 9/1980 |
| WO | WO 91/17044 | 11/1991 |

OTHER PUBLICATIONS

"Ageless®—A New Age in Food Preservation" Mitsubishi Gas Chemical Company, Inc.

"Copper (II) Ascorbate: A Novel Food Preservation System", Journal of Agricultural Food Chemistry, vol. 42, pp. 1616–1619 (1994) E. Graf.

"Anionic Clay Minerals" CHEMTECH (Jan. 1986) 58–63, W. T. Reiche.

"Hydrotalcite–Type Anionic Clays: Preparation, Properties, and Applications", Catalysis Today, vol. II, No. 2, Dec. 2, 1991, pp. (73–301) by F. Cavani, F. Trifiro and A. Vaccari.

Anorg. Allg. Chem. 499, pp. 99–108 (1983), Von H. D. Lutz, W. Eckers, W. Buchmeier and B. Engelen (English language abstract included).

Naturforsch 41b, pp. 852–858 (1986), W. Buchmeier, B. Engelen and H. D. Lutz (English language abstract included).

\* cited by examiner

Primary Examiner—Harold Pyon
Assistant Examiner—Sow-Fun Hon
(74) Attorney, Agent, or Firm—Mark B. Quatt

(57) ABSTRACT

A composition suitable for scavenging oxygen is disclosed which comprises a carrier having a combination of a hydroxosulfitometalate and a transition metal ion source.

25 Claims, No Drawings

OXYGEN SCAVENGER COMPOSITIONS

FIELD OF THE INVENTION

The present invention relates to novel compositions and processes of scavenging oxygen to improve product quality and shelf life of oxygen sensitive materials. The compositions can be formed into films, coatings, 3-dimensional solids, fibers, webs, and shaped products or structures which are incorporated into, applied to, or otherwise become a part of a container structure.

BACKGROUND OF THE INVENTION

In order to enhance preservation, it is standard practice to package food and other materials within laminated packaging material that generally includes a barrier layer, that is, a layer having a low permeability to oxygen. The sheet material can be thin, in which event it is wrapped around the material being packaged, or it can be sufficiently thick that it forms a shaped container body that is provided with a lid or other separate closure. The polymeric sheet material may constitute some or all of the interior exposed surface area of the container or its closure means.

It is known to include an oxygen scavenger agent in sheet material. The oxygen scavenger agent reacts with oxygen that is trapped in the package or that permeates into the package. This is described in, for instance, U.S. Pat. Nos. 4,536,409 and 4,702,966 and the prior art discussed in these references. U.S. Pat. No. 4,536,409, for example, describes cylindrical containers formed from such sheet material and provided with metal lids.

When the container is formed of a glass or metal body and is provided with a hermetically sealed metal closure, the permeation of oxygen through the body and the closure is theoretically impossible because of the impermeability of the materials forming the body and closure. As a practical matter, metal cans can reliably prevent oxygen ingress. However, some oxygen ingress may occur by diffusion through the gasket or the like positioned between a container body and its lid or end portion. It has long been recognized that when conventional containers of these types are used for the storage of oxygen sensitive materials, the shelf life of the stored materials is very limited. The quality of the packaged material tends to deteriorate over time, in part because dissolved oxygen typically is present in the container from the time it is filled; and in part due to oxygen ingress which occurs during storage.

When the container is a can, the can end or other closure often includes push and pull components which are manipulated by pushing and/or pulling to permit removal of a fluid or other material from the container without removing the entire closure from the container. These push or pull components are often defined by discontinuities or lines of weakness in the panel of the closure. Problems that can arise at these lines of weakness or discontinuities include the risk of permeation of oxygen into the container and the risk of oxidation corrosion of the metal where the normal protective lacquer coating is ruptured at the lines of weakness or discontinuities.

It is desirable to extend shelf life or packaged products using materials capable of being fabricated into or as part of a film, liner material, closure, gasket or other member of a package intended for storage of oxygen sensitive products.

Various types of oxygen scavengers have been proposed for this purpose. For example, it is well known to package iron powder in a sachet for this purpose. See Mitsubishi Gas Chemical Company, Inc.'s literature titled "Ageless®—A New Age in Food Preservation" (date unknown). These materials require the addition of water soluble salts to enhance the oxygen scavenging rate. However, in the presence of moisture, the salts, and iron and its oxides tend to migrate into liquids, producing off-flavors. Similarly, U.S. Pat. No. 4,536,409 issued to Farrell et al. recommends potassium sulphite as a scavenger, with similar results.

It is known in the art that ascorbic acid derivatives (ascorbic acid, its alkali metal salts, optical isomers, and derivatives thereof) as well as sulfites, bisulfites, phenolics, etc. can be oxidized by molecular oxygen, and can thus serve as an oxygen scavenging material. For example, U.S. Pat. No. 5,075,362, issued to Hofeldt et al., discloses the use of ascorbate compounds in container closures as oxygen scavengers.

U.S. Pat. No. 5,284,871 issued to Graf relates to the use of an oxygen scavenging composition made of a solution of a reducing agent and dissolved species of copper which are blended into foods, cosmetics and pharmaceuticals. Copper ascorbate is used in the examples. The reference indicates that relatively high levels of $Cu^{2+}$ (~5 ppm) are required in the food for scavenging to be effective but if small amounts of the $Cu^{2+}$ are used, it may combine with oxygen in the packaged food to cause food spoilage. In order to avoid spoilage, one is required to reduce the amount of headspace $O_2$ by some other means such as by partially flushing the container with an inert gas (See U.S. Pat. No. 5,284,871 at Col. 5, lines 32–39). A paper by E. Graf, "Copper (II) Ascorbate: A Novel Food Preservation System", Journal of Agricultural Food Chemistry, Vol. 42, pages 1616–1619 (1994) identifies copper gluconate as a preferred raw material.

The scientific literature (See "Polymer Compositions Containing Oxygen Scavenging Compounds", Teumac, F. N.; et al. WO 91/17044, published Nov. 4, 1991, filed on May 1, 1991) discloses that oxidation rates of ascorbate compounds can be increased by the use of catalysts. Typical catalysts for ascorbic acid and its derivatives are water soluble transition metal salts.

In each of the above references, the active component of the oxygen scavenging systems utilized agents which readily transfer into the food or other packaged product or materials or which produce oxidation by-products which are known to adversely affect a wide range of packaged material.

It is highly desired to provide an effective oxygen scavenging composition which has a high oxygen absorption rate and capacity.

It is also highly desired to provide an effective oxygen scavenging composition which has a high oxygen absorption rate and capacity and which does not adversely effect the color, taste or smell of packaged material.

It is further desired to provide an effective oxygen scavenging composition which has the active oxygen scavenger material contained within a carrier suitable for forming at least a part of a package or container article and to have the material provide effective scavenging activity and capacity.

It is still further desired to provide an effective oxygen scavenging composition which is thermally stable and, thereby, capable of being formed and processed at elevated temperatures.

SUMMARY OF THE INVENTION

The present invention is directed to a composition comprising a carrier having uniformly distributed therein an oxygen scavenging system capable of exhibiting high initial oxygen scavenging activity and enhanced oxygen scavenging capacity while avoiding undue migration of the components of the composition and its oxidation by product(s) from the carrier. The inhibition to migration significantly reduces or eliminates adverse effects of color, taste and smell of packaged articles which are in contact with or contained in a container having said composition. Specifically, the present composition comprises a carrier having a combination of hydroxosulfitometalate and a transition metal ion source, as fully described herein below.

The present invention is further directed to shaped structures containing or derived from the subject composition. Such structures can comprise one or more layers of a film suitable for forming a closed package (e.g., pouch) as well as semi rigid or rigid containers, including closures, such as closure sealants, closure gaskets, fluid-applied sealant compositions (e.g., melt-applied crown cap gasket compositions), cap liner discs, and the like, formed with or containing the subject composition.

DETAILED DESCRIPTION OF THE PREFERRED EMBODIMENTS

The present invention is directed to an oxygen scavenging composition formed of a carrier, preferably polymeric, containing an effective oxygen scavenging amount of a combination of hydroxosulfitometalate (which may occasionally be referred to herein as "HSM") and a transition metal compound distributed within the carrier material, as fully described herein below.

The term "combination" and "system", as used herein and in the appended claims, refers to active oxygen scavenging agents comprising at least one hydroxosulfitometalate (HSM) in combination with at least one transition metal ion source. The transition metal ion source may be present as a transition metal compound which forms a substantially homogeneous mixture with HSM; or as a transition metal compound coated on the surface of the HSM; or as transition metal ions substituted for at least a portion of the non-transition of the HSM; or a combination thereof.

The term "composition" as used herein and in the appended claims refers to the active oxygen scavenging agents forming the system and a carrier component. The carrier can be a polymer matrix in which the particulate material forming the subject oxygen scavenging system is substantially uniformly distributed, or a film or mat (woven or non-woven) having the particulate material substantially uniformly distributed therein or deposited thereon, or a moisture permeable pouch or sachet which contain the subject particulate material distributed therein.

The carrier can comprise one or more polymers and optional additives (e.g., fillers, plasticizers, surfactants, etc.) forming a matrix in which particulate HSM and transition metal compound are substantially uniformly distributed, or a film or mat (woven or non-woven) having the subject admixtures substantially uniformly distributed therein and/or deposited thereon, or a moisture permeable pouch or sachet which contains the subject oxygen scavenging combination therein.

The present invention further provides an improved container for packaging materials, such as food, beverages and the like, which are susceptible to oxidative degradation. The present improved container is capable of retaining product quality and enhanced shelf life of the packaged material without adversely affecting the color, taste or smell of the packaged material. It further provides a packaging system which can have high levels of oxygen scavenger agent therein while meeting government regulatory standards related to amounts of such agents contained in food products.

The hydroxosulfitometalates which are a component of the subject oxygen scavenger combination of the present invention can be represented by the formula

$$M^{I}M^{II}{}_{2}OH(SO_3)_2 \cdot H_2O$$

wherein $M^{I}$ is a monovalent cation; and $M^{II}$ is a divalent metal cation. Preferably, $M^{I}$ comprises a monovalent inorganic or organic cation such as $Li^+$, $Na^+$, $K^+$, $NH_4^+$, or $NR_4^+$ where each R independently represents a hydrogen, an alkyl (preferably a $C_1$–$C_3$ alkyl) or aryl moiety, or mixture thereof, and $M^{II}$ comprises a divalent metal cation such as $Ca^{2+}$, $Mg^{2+}$, $Mn^{2+}$, $Zn^{2+}$, $Fe^{2+}$, $Co^{2+}$, $Ni^{2+}$, $Cu^{2+}$, or mixture thereof. The hydroxosulfitometalates (HSM) have layered inorganic structures. They can be formed according to the procedures described in Anorg. Allg. Chem. 499, Pg. 99–108 (19830 by V. H. D. Lutz, W. Eckers, W. Buchmeier and B. Engelan; and in Naturforsch 416, Pages 848–852 (1986) by W. Buchmeier, B. Englene, V. H. D. Lutz. The teachings of each of the above references are incorporated herein in its entirety by reference.

The preferred HSMs are those having $M^{I}$ selected from $Li^+$, $Na^+$, $K^+$; and $M^{II}$ selected from $Mg^{2+}$, $Fe^{2+}$, $Co^{2+}$, $Cu^{2+}$. When $M^{I}$ is selected from $NR^+{}_4$, it is preferred that each R represents a $C_1$–$C_3$ alkyl group.

The HSM oxygen scavenging agent is used in combination with small amounts of transition metal ions. These ions can be provided by the presence of an inorganic or organic transition metal compound and/or by ion replacement with some $M^{II}$ of the HSM. This admixture or combination has been found to provide a composition having enhanced oxygen scavenging activity and capacity. Thus, the oxygen within the atmosphere of a container is removed at a high initial rate and the present scavenging composition is capable of removing greater amounts of oxygen per unit of the present combination then obtainable by compositions not formed from the subject combination.

It has been unexpectedly found that one can obtain a highly effective oxygen scavenger by combining HSM with a transition metal compound. The transition metal compound may be in the form of a salt, chelate, complex or compound in which the transition metal is associated with other elements or groups by ionic or covalent bonds.

The transition metals found useful herein are those of the series of metals of the Periodic Table in which the filling of the outermost shell to eight electrons is interrupted to bring the penultimate shell from 8 to 12 or 32 electrons. These elements use both their penultimate shell orbits as well as outermost shell orbits in bonding. Thus, the transition elements include elements of the first transition series of the Periodic Table composed of elements 21 through 29 (Sc, Ti, V, Cr, Mn, Fe, Co, Ni and Cu or mixtures thereof) and, of these, the preferred metals are cobalt, copper, iron, tin, nickel and manganese or mixtures thereof with copper and cobalt being most preferred. The positive oxidation state of the metal when introduced as part of the system is not necessarily that of the active state which causes enhanced activity and capacity to the system.

Transition metal compounds suitable for providing the presence of the metal ion may be in the form of an organic transition metal complex, chelant or organic carboxylic acid salt. Examples of suitable organic transition metal compounds are:

(1) Metal Salts of mono-, di- and poly-carboxylic acids having a carbon chain length of $C_1$–$C_{20}$ or so. The carbon chain can be aliphatic or aromatic, substituted or unsubtituted, may contain unsaturation or may be a fatty acid. Illustrative examples of such metal salts are:

aliphatic monocarboxylic acids such as, formic, acetic, propionic, butyric, valeric, caproic, caprylic, capric, lauric, tridecanoic, myristic, pentadecanoic acids and the like;

aliphatic dicarboxylic acids such as, oxalic, malonic, succinic, glutaric, adipic, pimelic, azelaic, sebacic acids and the like;

poly-carboxylic acids such as, citric acid and the like;

acids containing unsaturation such as, oleic, linoleic, sorbic, glutaconic, hydromuconic, octenedioic acids and the like;

aromatic acids such as, benzoic, salicylic and the like and may be unsubstituted or substituted;

fatty acids such as, higher carbon monoacids, preferably having the carboxyl group located terminally, for example palmitic, stearic, nonadecanoic acids and the like;

The acid may be substituted with hydrocarbyl groups which may be composed of straight or branched chains, typically an aliphatic group. having 1–6 carbon atoms or an aromatic group, for example, cyclohexanebutyric acid and 2-ethylhexanoic acid. Further, the acids may have other substitution groups such as aldehyde or hydroxyl groups, for example, as contained in glyoxylic acid, glycolic acid, or gluconic acid and the like;

(2) Metal Chelate acid/base complexes such as those formed with ethylenediaminetetraacetic acid, phthalocyanine, tetraphenyl porphines and naphthalocyanines, and the like;

(3) Metal Sulfonic acid containing compounds such as p-toluenesulfonic acid and the like;

(4) Metal Ionomer salt in which a polymeric counterion is employed. Such ionomers are well known in the art; or (5) Metal Ligands in which the transition metal is associated with acetylacetonate, benzoylacetonate, 2,2,6,6-tetramethyl-3,5-heptanedionate and the like.

The preferred organic transition metal compounds are, for example, cobalt (II) neodecanoate, cobalt (II) oleate, cobalt (II) 2-ethylhexanoate, copper (II) stearate, copper (II) 2-ethylhexanoate, copper (II) palmitate, copper (II) acetate, copper (II) gluconate, cobalt (II) acetate, iron (II) acetate, iron (III) acetylacetonate, iron (II) gluconate, manganese (II) acetate, nickel (II) 2-ethylhexanoate and the like.

Alternately, the transition metal compound may be in the form of an inorganic transition metal salt. The salt may be a water-soluble or a water-insoluble salt. The salts may be transition metal halides, sulfites, sulfates, sulfides, phosphites, phosphates, pyrophosphates, phosphides, hypophosphites, nitrites, nitrates, oxides, carbonates, hydroxides, chlorates, bromates, chromates, chromites, titanates, borides, perchlorates, tetrafluoroborates, tungstates and the like and mixtures thereof.

Examples of such salts include Copper (I or II) sulfide, Copper (I or II) bromide, Copper (I or II) chloride, Copper (I or II) oxide, Copper (II) carbonate, Copper (II) fluoride, Copper (II) hydroxide, Copper (I or II) iodide, Copper (II) nitrate, Copper (II) nitrite, Copper (II) sulfate, Cobalt (II) bromide, Cobalt (II) carbonate, Cobalt (II) choride, Cobalt (II) hydroxide, Cobalt (II) nitrate, Cobalt (II) sulfate, Cobalt (II or III) oxide, Iron (II or III) bromide, Iron (II or III) chloride, Iron (II or III) fluoride, Iron (III) nitrate, Iron (II or III) oxide, Iron (II or III) perchlorate, Iron (III) phosphate, Iron (II or III) sulfate, Iron (II) sulfide, Manganese (II) bromide, Manganese (II) carbonate, Manganese (II) chloride, Manganese (II, III or IV) oxide, Manganese (II) hypophosphite, Manganese (II) nitrate, Manganese (II) sulfate, Nickel (II) bromide, Nickel (II) chloride, Nickel (II) hyrdoxide, Nickel (II) oxide. The preferred inorganic salts useful in forming the present oxygen scavenger system and composition are copper (II) sulfate, copper (I) chloride, copper (II) chloride, cobalt (II) sulfate, iron (II) chloride, iron (III) chloride, iron (II) sulfate, manganese (II) sulfate, tin (II) sulfate and nickel (II) sulfate.

The term "compound" as used herein and in the appended claims refers, except where specifically indicated otherwise, to materials which have the metal in a valence state other than zero and are bound to a counter moiety, such as in a salt, complex, chelate or other form which provides a stable material.

The oxygen scavenging combinations of the present invention comprise an HSM oxygen scavenger and a transition metal ion source. When the transition metal ion source is in the form of an inorganic or organic transition metal compound, as described above, it may be physically mixed with the HSM to provide a substantially uniform mixture of the HSM and transition metal compound. This mixture is uniformly distributed in the carrier to provide the oxygen scavenging composition of the present invention. The physical mixture can be formed by initially mixing the HSM and the transition metal compound and then introducing this mixture into a carrier. Alternately, the HSM and the transition metal compound can be separately mixed with the carrier and then each of the loaded carriers can be mixed together to provide a uniform mixture of the compound and HSM in a carrier matrix.

Alternately, the HSM can be coated with the transition metal compound to provide an intimate mixture of the two components forming the oxygen scavenger combination of the present invention. As stated above, HSM has a layered structure and, thereby, provides a high surface area which can be at least partially coated with a transition metal compound. This coating can be done by any conventional manner such as treating the HSM with a solution of the transition metal compound to the point of incipient wetness and then removing the solvent. The present HSM/transition metal compound combination can be an intimate mixture of HSM and transition metal compound and HSM coated with transition metal compound.

Still further, the transition metal compound can be used as a source of transition metal ion which is ion exchanged with a portion of the non-transition metals (e.g., $Ca^{+2}$, $Mg^{+2}$) of the HSM. This can be accomplished by introducing a transition metal compound (preferably as a salt) into the reagents used to form HSM. Alternately, one can contact a previously formed HSM with a solution of a transition metal salt for a period of time and elevated temperatures to cause ion exchange to occur (e.g., at least 60 minutes, preferably from 120 to 360 minutes contact time. It is desirable to wash the resultant HSM with water or a water-alcohol mixture to remove the exchanged salt by-product. The resultant product may be composed of HSM which has transition metal compound intimately admixed therewith and/or coated on its surface as well as transition metal ion as part of the HSM.

The aqueous solution used to coat the transition metal compound onto and/or ion-exchange the transition metal ion with the HSM must be free of oxygen. The process should be done in an oxygen free atmosphere. The oxygen scavenging combination of the present invention has been found to provide effective oxygen scavenging activity and rate when the agent is placed in the presence of oxygen and moisture. Thus, the presently described oxygen scavenging compositions of the invention must be maintained in the absence of oxygen during formation and the absence of oxygen or moisture during storage. When the present agent is formulated into an oxygen scavenging composition with a carrier, such as a polymeric matrix, the carrier should be able to maintain the agent substantially free from moisture to the degree required to trigger (initiate) a high rate of oxygen scavenging to occur.

The amount of the HSM oxygen scavenging agent will depend on the anticipated application of the resultant scavenging composition. When large amounts of composition are used to scavenge small volumes of oxygen (such as might be the case if a relatively thick polymeric coating were used to coat the entire interior surface of a can), the amount of HSM oxygen scavenging is agent can be as low as about 0.05 weight percent of the composition and preferably at least 1 weight percent of the composition. Generally speaking, the HSMs may be used in the range of 0.05–90% based on total weight of the composition; more preferably 0.5–40%; and most preferably 1.0–25% based on total weight of composition. In some conventional applications, such as cap liners, crown gasket compositions, can sealants, and the like, where the loading of the particulate in the polymer carrier is low and/or the amount of composition is small, the amount of oxygen scavenging agent can be at least about 1 weight percent, preferably from 2 to 40 weight percent, and more preferably from 3 to 25 weight percent based on the weight of the composition.

The amount of HSM oxygen scavenging agent required for a particular application can be readily determined by the artisan. When the oxygen scavenger particulate is incorporated into a gasket, the amount is normally at least 0.05 weight percent (e.g., 0.05 to 90%) based on the total weight of the composition, generally at least 1% and preferably at least 2% (e.g. 2 to 9%, preferably 2 to 40% and more preferably from 2 to 25%). In the case of a plastisol, lacquer, or hot melt applied to the center panel of a closure, where the carrier does not otherwise serve as a gasket, the amount can be much higher. For example, loadings of 20 to 60 weight percent, or in some cases up to 90 weight percent are workable. When the composition is in the form of a film, mat, pouch or sachet, the oxygen scavenger should be present in an amount to effectively scavenge oxygen during the contemplated storage period of the container for the appropriate contents. An amount of from about 0.01 to 2 grams of scavenging combination will effectively scavenge oxygen of a container of normal size. The present invention provides the ability to achieve a wide range of HSM scavenger agent content including high weight percentages.

The transition metal component described above should be present in the subject composition in mole ratio of HSM to transition metal of the transition metal compound of from about 3000:1 to 1:1 with from 2000:1 to 5:1 being preferred and from 100:1 to 10:1 being most preferred. In certain applications the ratio may be greater or lesser to provide for effective scavenging of oxygen.

Exemplary HSM and transition metal compound suitable for use in the present invention are finely divided solids (e.g., particle size of 10 to 500 microns) that are particularly suited to replace part or all of the filler commonly found in sealant, coating, or film compositions which are applications contemplated herein. The subject composition as a whole is effectively anhydrous, that is, it provides a moisture content lower than needed to trigger (initiate at a substantial rate) oxygen scavenging. Thus, it is preferred that the carrier component of the composition be a polymeric matrix (i.e., a three-dimensional structure into which the HSM and transition metal compound are incorporated). Generally, the polymeric matrix substantially protects the scavenger from moisture under normal atmospheric conditions and, therefore the oxygen scavenger agent remains substantially inert to scavenging activity. However, once a high degree of moisture is attained, as in a closed package environment of food products, the scavenging activity is initiated or triggered. Moisture ingress into the polymeric matrix carrying the HSM/transition metal compound combination may optionally be accelerated by hot filling, sterilization, pasteurization, retort, and the like. A carrier comprised of a polymeric matrix should be sufficiently permeable to permit moisture and oxygen to pass into the matrix to contact the particulate HSM material.

In one embodiment of the present invention, the carrier of the subject composition comprises at least one polymer matrix, that is to say polymeric material (including optional additives such as plasticizers, fillers, surfactants, etc.) that will form a solid matrix having distributed therein the oxygen scavenging combination of the present invention. The polymeric matrix carrier will be selected with regard to the nature of the composition (e.g., film, dispersion, latex, plastisol, dry blend, solution or melt) and its utilization as part of the container and/or closure.

The carrier is preferably chosen from at least one polymeric material that can form a solid or semi-solid matrix. The polymeric carrier can be derived from a variety of polymers which are available from a variety of bulk physical configurations such as films, dispersion, latex, plastisol, dry blend, solution, or melt (e.g., thermoplastic meltable polymer). The particular physical configuration of the polymer selected will depend on the end structure into which the subject composition is eventually formed or incorporated. The polymeric matrix is derived from polymer types which may be thermoplastic or thermosetting.

The primary functions served by the polymer matrix for purposes of the present invention are to provide a compatible carrier (a material which is stable under normal packaging temperature conditions and does not deactivate the oxygen scavenger agent) for the HSM/transition metal compound combination of the present invention as described herein, permit the HSM/transition metal compound combination to be maintained under substantially anhydrous or low moisture conditions during storage, and to permit ingress of both oxygen and water into the composition under dictated conditions and in a manner which permits them to come into contact with the HSM/transition metal compound combination. The scope of the polymer(s) in general can be very broad. However, the polymer matrix may also be selected to perform additional functions depending on the physical configuration in which it is provided in a final structure into which it is shaped or incorporated. Thus, the particular polymer or mixture of polymers selected ultimately will be determined by the end use in which it exerts its oxygen scavenging effect.

Accordingly, suitable polymers from which an exemplary polymeric matrix of the present invention may be derived include polyolefins, vinyl polymers, polyethers, polyesters, polyamides, phenol-formaldehyde condensation polymers, polysiloxanes, ionic polymers, polyurethanes, acrylics and naturally occurring polymers such as cellulosics, tannins, polysaccharides, and starches.

Suitable materials for use as polymeric matrix carriers in the form of latex compositions, such as for can ends, are described in U.S. Pat. Nos. 4,360,120; 4,368,828 and EP 0182674. Suitable polymeric materials for use when the compositions are organic solutions or aqueous dispersions are described in U.S. Pat. Nos. 4,360,120; 4,368,828; and GB 2,084,601. Suitable materials for use in thermoplastic compositions include the materials proposed in U.S. Pat. Nos. 4,619,848; 4,529,740; 5,014,447; 4,698,469; GB 1,112,023; GB 1,112,024; GB 1,112,025 and EP 129309. The teachings of each of the references cited herein above are incorporated herein by reference in their entirety.

In particular, the polymeric material can be generally selected from polyolefins as, for example, polyethylene, polypropylene, ethylene/propylene copolymers, acid modified ethylene/propylene copolymers, polybutadiene, butyl rubber, styrene/butadiene rubber, carboxylated styrene/butadiene, polyisoprene, styrene/isoprene/styrene block copolymers, styrene/butadiene/styrene block copolymers, styrene/ethylene/ butylene/styrene block copolymers, ethylene/vinyl acetate copolymers, ethylene/acrylate and ethylene/(meth) acrylate copolymers (for instance, ethylene/butyl acrylate or ethylene/butyl methacrylate copolymers), ethylene/vinyl alcohol copolymers, ethylene or propylene/carbon monoxide alternating copolymers, vinyl chloride homopolymers and copolymers, vinylidene dichloride polymers and copolymers, styrene/acrylic polymers, polyamides, and vinyl acetate polymers, and blends of one or more of these. Polyethylenes found useful in forming the subject composition include high density polyethylene (HDPE), low density polyethylene (LDPE), linear low density polyethylene (LLDPE), ultra-low density polyethylene (ULDPE) and the like as well as copolymers formed from ethylene with one or more other lower alkenes (e.g., octene) and the like.

Compositions according to the invention particularly useful to form films and the like may comprise a thermoplastic polymer as, for example, polyethylene or copolymers of polyethylene such as, ethylene/vinyl acetate and the like or polyethylene blends such as, blends of HDPE and butyl rubber; polyethylene and ethylene/vinyl acetate copolymer; as well as polyethylene and styrene/butadiene/styrene block polymer and the like. The polyethylene, if used, is preferably a low density polyethylene, and may be a very low or ultra low density polyethylene which may be branched or linear. The ethylene/vinyl acetate copolymer, if used, preferably has a melt index in the range 3 to 15, preferably 5 to 10, and generally contains 5 to 40%, preferably 5 to 30%, vinyl acetate.

Particularly preferred compositions for use as liners and the like for semi-rigid packages (e.g., cans) are a plastisol or a dry blend of polymer. These may be used in combination with a plasticizer for forming the polymer matrix. Suitable materials for use when the compositions are plastisols include vinyl chloride homopolymers and copolymers. Instead of preparing such compositions as true plastisols, they may be provided as dry blends of the polymer and plasticizer. The proportion of plasticizer present in a vinyl resin plastisol may be any conventional proportion, typically from 30 to 150 weight parts of plasticizer per hundred weight parts of vinyl resin.

The polymer carrier may be formed from various thermosetting resins such as polyurethanes, phenolics, epoxyester resins, epoxy resins, polyesters and alkyds. These resins are normally formed into solutions or suspensions with organic liquids and applied to the inner surface of a container followed by application of elevated temperature to remove the liquid and cause solidification (e.g., by crosslinking) of the resin coating on the substrate.

Exemplary polymeric carriers of the invention may further contain conventional plasticizers, including phthalates, adipates, glycols, citrates and epoxidized oils and the like. Examples include for example dioctyl phthalate, diisooctyl phthalate or diisodecyl phthalate, which are readily available. Other usable plasticizers are butyl benzyl phthalate, acetyl tributyl citrate, ethyl diphenyl phosphate and diisobutyl phthalate. One particularly useful combination of plasticizers for use with a vinyl chloride/vinyl acetate copolymer resin is a mixture of diisodecyl phthalate and diisooctyl phthalate in a weight ratio of about 7–8:1. In addition, the carriers of the invention may further contain inert filler, slip aids, process aids, pigments, stabilizers, anti-oxidants, tackifying resins, foaming agents and other conventional additives in conventional amounts, depending upon the nature of the composition and its final use.

If the carrier comprises a thermoplastic polymer, the total amount of such additives is generally below 10%, most preferably below 3%, based on the total weight of the composition. However, when the carrier is in the form of a plastisol, dispersion, organic solution or latex, the amounts of additives based on total weight of the composition may be higher. When an anti-oxidant is incorporated, it should be present in amounts capable of stabilizing the polymeric composition against degradation due to free-radicals formed during processing. However, the amount of anti-oxidant should be small enough to permit the subject HSM/transition metal compound oxygen scavenger combination of the present composition to effectively react with molecular oxygen. The specific amount will depend on the anti-oxidant used and can be determined by minor experimentation. In certain instances, the amount of filler normally used may be at least partially replaced by the presently required solid particulate HSM oxygen scavenging agent which has been mixed, coated or ion-exchanged with the transition metal compound, as described herein above.

A preferred aspect of the invention is that the HSM/transition metal compound oxygen scavenger combination should remain substantially inert in the composition until the composition forms or is on or in a sealed container or closure. Exposure of the composition to high humidity that normally exists within a sealed container will, therefore, result in sufficient permeation of moisture into the composition and cause the subject oxygen scavenger combination to initiate an active degree of scavenging. This will result in improved shelf life of the packaged material. In addition, the scavenging reaction can be accelerated by heating the composition sufficiently while in the closed container to cause increased permeation of moisture. Thus, the HSM/transition metal compound oxygen scavenger combination preferably remains substantially inert in or on the carrier until the scavenging reaction is initiated by moisture. Where the subject oxygen scavenger agent has a sufficient amount of water molecules associated with it to provide moisture required to cause oxygen scavenging, it is preferred that compositions having such hydrated particulate material be stored under an inert atmosphere until used.

Preferably, the oxygen scavenging reaction of the present composition is accelerated by pasteurizing (typically at 50°–100° C.) or sterilizing (typically at 100°–150° C.) the container after filling it with an aqueous fill and sealing it. This triggering appears to be a consequence of the subject composition, when heated, permitting moisture to permeate into the composition and contact the subject oxygen scavenger agent and its combination. The moisture becomes trapped in the composition, thereby bringing the scavenger agent into contact with sufficient water to permit reaction with the oxygen present. This oxygen may permeate through the composition either from oxygen trapped within the container when it was filled or which subsequently enters the container from the surrounding atmosphere.

While some conventional oxygen scavenging agents degrade when subjected to elevated temperatures, the subject oxygen scavenger combination has been found to be stable to elevated temperatures commonly experienced in processing polymers into films or coatings, removing solvents from plastisol compositions, pasteurization, sterilization and the like processes commonly encountered in packaging technology.

The composition of the invention may be formulated in any convenient form, such as a melt extrusion, plastisol, organic solution, dry blend, latex or dispersion. The main ingredients of the composition, apart from the HSM/transition metal compound oxygen scavenger combination, may comprise conventional materials. It is preferred that the total composition should be non-aqueous (i.e., an anhydrous solution, plastisol or thermoplastic melt) so as to prevent initiation of the scavenging reaction within the composition.

The composition of the present invention can be compounded and extruded, injection molded or thermo-formed into desired shapes when the polymer matrix is a thermoplastic resin. For example, the subject compositions can be formed into films per se or as a layer or component of a film used to prepare flexible packaging, such as bags, or the films can be laminated onto metal stock which can then be formed into cans and closures. Also, the compositions may be included in flexible packaging such as multilayer films or laminates or as a ribbon, patch, label or coating on a thermoplastic bag or lidstock. When the subject composition is part of a multi-layer film, the layer formed of the present composition may be the surface layer which will be exposed to the inner surface of the resultant flexible package or an inner layer which is covered by a surface layer having sufficient permeability to permit the $O_2$ and moisture to penetrate into and contact the layer containing the present composition. Thus, the term "exposed to the interior", as used herein and in the appended claims shall mean either direct or indirect exposure of the subject composition to the inner atmosphere of a sealed container having packaged product contained therein.

The carrier of the present invention may be selected from those used to form coatings on at least a portion of the interior surface of a package (e.g., a rigid container such as a can, can lid, box, carton, or the like). Polymers forming the carrier may be selected from polymer classes commonly referred to as epoxides, phenolics (e.g., phenol-formaldehyde condensation polymer), lacquers (e.g., cellulose esters or ethers, shellac, alkyl resins and the like), polyurethanes and the like. The polymer carrier may be mixed with the above described oxygen scavenger agent and transition metal compound to provide an encapsulated particulate which may be subsequently used in a second carrier or applied onto (such as by solvent or melt application) the surface of a second carrier material.

The subject composition can also be utilized to provide a coating on a carrier film. The carrier film can be formed from a polymeric material, such as those described herein above, capable of forming a film and upon the surface thereof is deposited the present oxygen scavenger composition. The film may be composed of a single layer or of a plurality of layers. The surface of the film can be coated with the subject HSM/transition metal compound oxygen scavenger combination by forming a suspension or dispersion of the particulates in a polymer and depositing the suspension or dispersion by a conventional means, such as spraying or knife coating application or the like, directly onto the film surface. The particular nature of the carrier film will depend upon the application contemplated and the ability of the carrier formed to have the oxygen scavenger adhered to its surface and substantially retain its integrity during use.

The carrier can, alternately, be in the form of a fibrous (woven or non-woven) mat. The subject oxygen scavenger composition is contained in the interstices of the mat structure. The fibers forming the mat may be formed from any suitable material or synthetic fiber such as cotton, glass, nylon, polyethylene, and copolymers of ethylene with one or more ethylenically unsaturated monomer, polypropylene and copolymers of propylene with one or more ethylenically unsaturated monomer and the like. The particular nature of the carrier mat will depend upon the application of its use and the ability of the mat to retain oxygen scavenger material within the interstices of the mat structure during use. The scavenger can be deposited into the mat structure by any means such as by dipping the mat into a dispersion or suspension of the scavenger and then removing the liquid from the mat or by first forming particulates of scavenger/polymer composition which is melt deposited onto and into the mat structure.

In another embodiment, the subject oxygen scavenger combination can be retained within a carrier in the form of a pouch or sachet of suitable size to be inserted in a container having an oxygen sensitive material therein. The pouch or sachet should be sufficiently porous to permit moisture and oxygen to penetrate through the pouch or sachet forming material at appropriate temperature/moisture conditions. The subject oxygen scavenger composition is thus composed of the pouch or sachet carrier having therein the particulate HSM oxygen scavenger agent which is mixed or coated with a transition metal compound and/or which has transition metal ions exchanged therein, per se, or having the particulate contained in a polymer matrix and provided for in the form of small particles of sufficient particulate size to permit the sachet structure to retain the particulate therein. The pouch or sachet can be formed from natural or synthetic materials such as paper, cotton cloth, polymer films and the like in manners well known to the packaging technology.

A fourth embodiment is to utilize a carrier in the form of a porous inorganic material, such as a ceramic having the oxygen scavenger agent distributed therein. The ceramic can be formed into any desired shape (e.g., spheres, cubes, cylinders and the like) and size which is suitable for insertion into the container having the oxygen sensitive material. Useful porous inorganic materials include conventional clay, cement pastes and the like.

It has been found that the above described oxygen scavenger compositions can be used for the preservation of oxygen sensitive foods stored at ambient conditions. The present compositions have an advantage over those compositions having oxygen scavengers, such as ascorbic acid derivatives, directly mixed into a polymer matrix because the present compositions inhibit the release of scavenger agent and/or oxidation by-products which may contaminate the food material. The HSMs are particulate material that contains, as a part of their structure, a moisture-triggerable oxygen scavenging moiety. It has been found that this moiety has enhanced oxygen scavenging activity and capacity when in the presence of a transition metal compound yet the moiety is bound to the HSM in a manner which substantially prevents migration of the oxygen scavenging moiety or its oxidized product into the packaged material. Therefore, the present invention unexpectedly provides a highly desired oxygen scavenger composition which does not cause discoloration or detract from taste of the packaged food product while achieving a highly effective scavenging composition.

The compositions of the invention have been unexpectedly found to provide a desirable means of providing a large degree of oxygen scavenging activity and enhanced capacity and activity to scavenge oxygen while not allowing the initial oxygen scavenging material and/or any resultant oxidation by-product migrate into or adversely effect the color, taste or smell of articles in contact with the subject composition.

The composition of the invention in the form of a film can, for example, be laminated to paperboard to form gable-top cartons. The film may further comprise oxygen barrier layers and/or heat sealable layers.

The invention formed with a carrier film can be applied as a center panel lining on a container closure. The closure can be a cap, can end, lid stock or film. The invention also includes container closures carrying a solid deposit formed on the closure from a fluid-applied or melt-applied composition, or as a film, that is positioned to seal around, or over a line of weakness in, the closure. The solid deposit can be a gasket deposited around the closure and formed from the composition. Instead of, or in addition to the deposit being such a gasket, the composition can be deposited on the inner face of a closure at a position where there is a discontinuity or line of weakness around a push or pull component for opening a container sealed by the closure. The closure occupies, as is conventional, only a minor part of the exposed surface area of the closed container, often less than 25% of the surface area. Thus, the area of the solid deposit can be very small relative to the area of the container. Despite this, the invention can give greatly improved storage stability to the contents. The invention includes filled containers sealed with such closures. The sealed container comprises a container body, the container closure, and the packaged material that is contained within the container body. The container body may be a polymeric film (single or multi-layer), glass or metal. The closure may be a heat seal or, in the case of a glass or metal container body, it is preferably of metal. The packaged material can be any beverage, foodstuff or other material that is to be stored within the container but the invention is of particular value when the filling is a material whose shelf-life or product quality is normally restricted due to oxygen ingress or contamination during storage. The container body can be a can, generally of metal, in which event the closure is a can end. Generally the entire closure is of metal or polymeric material but the panel of the closure can include a removable component of either metal or polymeric material.

Instead of a can body, the container body can be a bottle or jar in which event the closure is a cap. The bottle or jar is preferably of glass but it can be of polymeric material with very low oxygen permeability. The cap can be of polymeric material, for instance a polypropylene, that may include a barrier layer. Generally, the cap is formed of metal and may include a push or pull component of metal or polymeric material. The cap may be a crown cap such as a pry-off or twist-off crown, a twist-on cap, lug cap, press-on/twist-off, or press-on/pry-off cap, a screw-on cap, roll-on metal cap, continuous thread cap, or any other conventional form of metal cap or polymeric cap suitable for closing the bottle or jar.

A gasket is normally provided between the container body and the closure. This gasket can be used to carry the composition of the invention (in particular, as a polymer matrix containing composition) either as a blend in the gasket composition or as a separate component applied on or near the gasket but it is possible for the composition of the invention to be utilized elsewhere on the closure or elsewhere in the container. In that event the gasket-forming composition can be any unaltered conventional composition suitable for forming the gasket.

When the closure is a cap, the subject scavenger composition may form an overall gasket or a portion of an overall gasket. This is typically true for small diameter caps such as those less than 50 mm in diameter. For large diameter caps, the gasket is a ringlike gasket and may be deposited in a conventional manner from the gasket-forming composition. For instance, a ringlike gasket can be formed on a cap by being applied in liquid form as a ring and can then be converted to solid form by drying, heating to cure or cooling to set a thermoplastic, as appropriate. The oxygen scavenging composition could be blended into the gasket material, deposited on the gasket material, or applied to an area of the cap not covered by the gasket (the center panel). The gasket-forming composition may, for this purpose, be a dispersion, latex, plastisol, dry-blend, suitable thermoplastic composition or organic solution. The cap, carrying the gasket, is then pressed on to an appropriate sealing face around the open end of the filled container body and closed in conventional manner.

If the carrier composition is formed with a thermoplastic polymer, it may be applied as a low viscosity melt while the cap is spinning, so as to throw the composition into the form of a ring, or it may be applied as a melt which is then molded into the desired shape, often a disc having a thickened ring-like portion. Further, the gasket can be in the form of a pre-formed ring or disc which is retained (e.g., by mechanical or adhesive means) within the cap.

If the closure is a can end, the oxygen scavenging composition is typically not used in the gasket composition because, under typical can seaming conditions, the gasket is not substantially exposed to oxygen in the pack. Also, the seams are not particularly vulnerable to oxygen ingress. The oxygen scavenging composition is typically applied on a center panel or other interior surface in the can, such as applied as a coating of a can.

It is particularly preferred that the gasket or coating on the container closure be formed by applying a fluid or molten composition of the present invention formed with a fluid polymer matrix and solidifying it on the closure. The method of application and solidification is generally conventional. It is particularly preferred that the container and can end should both be of metal or the container body should be of glass and the closure of metal or plastic, since the use of the defined compositions for forming the gasket then appears to give particularly beneficial results. In particular, excellent results are achievable when the container body is a glass bottle and the closure is a metal cap.

In addition to use in metal, glass and plastic containers, the compositions can be used in a cardboard or laminated container such as a juice box. Such a container is a cardboard carton or tube with an interior liner. The composition can be placed in or laminated to the interior liner of the cardboard package, along a line of weakness at the package closure, or at any other convenient location in the package. Alternately, the present composition can be placed within the container as a film, mat or sachet.

The following examples are given for illustrative purposes only and are not meant to be a limitation on the present invention. All parts and percentages are by weight unless otherwise stated.

EXAMPLE 1

Synthesis of $NaMg_2OH(SO_3)_2 \cdot 1H_2O$ via $MgCl_2$ and $Na_2SO_3$

A sample of HSM was synthesized according to process described by Lutz et al. in *Z. Anorg. Allg. Chem.* 499, pages 99–108 (1988).

20.3 g (0.1 moles) $MgCl_2.6H_2O$ were dissolved in 79.7 g water. Separately, 12.6 g (0.1 moles) $Na_2SO_3$ were dissolved in 87.4 g water. The two solutions were combined in a 1 L round bottom flask equipped with condenser, magnetic stir bar, and oil bath, then heated to 95° C. for 2 hours during which time a precipitate was formed. The slurry was allowed to cool before vacuum filtering. The filter cake was washed with 1 L of water, then dried in a vacuum oven at 80° C. for 3 hours to yield 3.2 g (24%) of a white powder. The X-ray Diffraction (XRD) spectrum indicated the presence of $NaMg_2OH(SO_3)_2.1H_2O$ heavily contaminated with $Na_2SO_3.6H_2O$, and thus the yield was less than what would be expected.

EXAMPLE 2

Synthesis of $NaFe_2OH(SO_3)_2.1H_2O$ via $FeCl_2$ and $Na_2SO_3$

The following synthesis was adapted from the literature. 66.36 g (0.488 moles) sodium acetate trihydrate were dissolved in 200 g water in a 500 mL round bottom flask equipped with condenser, magnetic stir bar, and oil bath. 20.0 g (0.159 moles) sodium sulfite were added and dissolved. 15.69 g (0.079 moles) iron(II) chloride tetrahydrate were added and dissolved. The solution was heated to 105° C. for 1 h while stirring and gently bubbling a stream of $SO_2$ through it. Within 20 min. a thick precipitate had formed. The slurry was allowed to cool under an argon blanket. The solids were filtered and dried in a vacuum oven at 80° C. for 8 hours to yield 5.6 g of a fine golden-brown powder.

EXAMPLE 3

Synthesis of $NaFe_2OH(SO_3)_2.1H_2O$ via $MgCl_2$ and $Na_2SO_3$ 66.36 g (0.488 moles) sodium acetate trihydrate were dissolved in 200 g water in a 500 mL roundbottom flask equipped with condenser, magnetic stir bar, and oil bath. 20.0 g (0.159 moles) sodium sulfite were added and dissolved. 15.69 g (0.079 moles) iron(II) chloride tetrahydrate were added and dissolved. The solution was heated to 105° C. for 1 h while stirring and gently bubbling a stream of $SO_2$ through it. Within 20 min. a thick precipitate had formed. The slurry was allowed to cool under an argon blanket. The solids were filtered and dried in a vacuum oven at 80° C. for 8 h to yield 5.6 g of a fine golden-brown powder.

EXAMPLE 4

Synthesis of MnO-Supported $NaMn_2OH(SO_3)_2.1H_2O$ via $Na_2S_2O_5$

Sodium metabisulfite (23.77 g) was dissolved in 500 mL argon-purged water in a 1 L round bottom flask equipped with condenser, magnetic stir bar, thermometer and in an oil bath. Manganese oxide (20.16 g) was added to the solution. The slurry was heated to 95° C. with stirring for 1 h and then allowed to cool for 1 h before vacuum filtering. The filter cake was washed with 2 L of nitrogen-purged water and then dried in a vacuum oven at 80° C. for 8 h to yield 25.7 g of a mixture of green and white powders.

EXAMPLE 5

Synthesis of MgO-Supported $NaMg_2OH(SO_3)_2.1H_2O$ via $Na_2S_2O_5$

Water (500 mL) was charged to a 2 L flask equipped with condenser, thermometer, magnetic stir bar and oil bath. The water was purged with argon for 20 minutes. Sodium metabisulfite (23.77 g) was dissolved in the water under a stream of argon. MagChem® 10-325 (MgO, 20.16 g, 10 mm median particle size) was then suspended in the solution and heated to 95° C. with stirring for 6 h. After cooling to room temperature with stirring over night, the slurry was vacuum filtered. The filter cake was washed with 2 L of nitrogen-purged water and then dried in a vacuum oven at 80° C. for 8 h to yield 34.3 g of a fine white powder. The XRD spectrum clearly indicated that the hydroxosulfitometalate and unreacted magnesium oxide were both present at significant levels. There was no contamination with $Na_2SO_3.6H_2O$.

EXAMPLE 6

A series of samples were made by introducing 0.2 g of HSM of Example 5 into 3"×4" gas impermeable pouches followed by the addition of a transition metal salt in the amount indicated in Table 1 below (all salt additions were equimolar in metal ion). The HSM and transition metal salt were mixed together to provide a homogeneous mixture. The pouches were fitted with septa and heat sealed under vacuum. To each pouch 0.2 g of water, followed by 100 cc of air were introduced through the septa. The oxygen content of each pouch was measured at regular intervals thereafter by withdrawing 3 cc samples of the atmosphere in the pouches via gas syringe and injecting into a MOCON® model HS 750 Headspace Oxygen Analyzer. Samples were usually measured in duplicate or triplicate. The results, transformed into scavenging rates and capacities per gram of scavenger, are shown in Table 2 below.

TABLE 1

Soluble Transition Metal Catalysts

| Sample #: | DESCRIPTION | Transition Metal Salt (g) |
|---|---|---|
| Ex. 5 | Control HSM | — |
| Ex. 6-1 | Copper (II) Sulfate Pentahydrate | 0.0161 |
| Ex. 6-2 | Iron (II) Sulfate Heptahydrate | 0.0179 |
| Ex. 6-3 | Manganese (II) Sulfate Monohydrate | 0.0109 |
| Ex. 6-4 | Iron (II) Chloride Tetrahydrate | 0.0128 |
| Ex. 6-5 | Tin (II) Sulfate | 0.0139 |
| Ex. 6-6 | Copper (II) Chloride dihydrate | 0.0110 |
| Ex. 6-7 | Copper (I) Chloride | 0.0064 |
| Ex. 6-8 | Nickel (II) Sulfate Hexahydrate | 0.0170 |
| Ex. 6-9 | Iron (III) Chloride Hexahydrate | 0.0174 |
| Ex. 6-10 | Cobalt (II) Sulfate Hydrate | 0.0100 |

TABLE 2

Oxygen Scavenging of Transition Metal Catalyzed Hydroxosulfitometalates (0.2 g Samples)

| Sample #: | Catalyst Sample | Oxygen Scavenged | | |
|---|---|---|---|---|
| | | 1 hour (μmoles/g) | 2 day (μmoles/g) | 7 days (μmoles/g) |
| 5 | Control HSM | 67 ± 0 | 125 ± 13 | 646 ± 103 |
| 6-1 | Copper (II) Sulfate Pentahydrate | 104 ± 13 | 241 ± 1 | 385 ± 20 |
| 6-2 | Iron (II) Sulfate Heptahydrate | 186 ± 26 | 482 ± 44 | 688 ± 56 |
| 6-3 | Manganese (II) Sulfate Monohydrate | 52 ± 13 | 463 ± 50 | 958 ± 68 |

TABLE 2-continued

Oxygen Scavenging of
Transition Metal Catalyzed Hydroxosulfitometalates
(0.2 g Samples)

| Sample #: | Catalyst Sample | Oxygen Scavenged | | |
|---|---|---|---|---|
| | | 1 hour ($\mu$moles/g) | 2 day ($\mu$moles/g) | 7 days ($\mu$moles/g) |
| 6-4 | Iron (II) Chloride Tetrahydrate | 112 ± 22 | 458 ± 38 | 514 ± 67 |
| 6-5 | Tin (II) Sulfate | 67 ± 0 | 219 ± 0 | 484 ± 20 |
| 6-6 | Copper (II) Chloride | 127 ± 13 | 271 ± 25 | 490 ± 22 |
| 6-7 | Copper (I) Chloride | 134 ± 0 | 480 ± 65 | 918 ± 90 |
| 6-8 | Nickel (II) Sulfate Hexahydrate | 171 ± 13 | 979 ± 38 | 1332 ± 77 |
| 6-9 | Iron (III) Chloride Hexahydrate | 104 ± 34 | 617 ± 53 | 995 ± 86 |
| 6-10 | Cobalt (II) Sulfate Hydrate | 193 ± 13 | 1124 ± 45 | 1598 ± 35 |

The data is Table 2 clearly shows that the addition of various transition metal salts has a dramatic effect on the scavenging of the HSM material. Initial 1 hour scavenging was doubled (copper(II) sulfate, iron (II and III) chloride, and copper (I and II) chloride) or even tripled (iron (II) sulfate, nickel (II) sulfate, and cobalt (II) sulfate) versus the uncatalyzed control Sample 5. At the 2 day readings, scavenging was increased 2 to 9 times greater than the control. By 7 days the capacity limit of the materials had been approached and oxygen scavenging was 1.5 to 2.5 times higher than the uncatalyzed control.

What is claimed is:

1. An oxygen scavenger comprising a mixture of hydroxosulfitometlate and a separate, water soluble transition metal compound, said separate, water soluble transition metal compound having a transition metal component, and said hydroxosulfitometalate (HSM) comprising between 0.05 and 90 weight percent of said mixture and represented by the formula:

$$M^{I}M^{II}{}_2OH(SO_3)_2 \cdot H_2O$$

wherein $M^{I}$ represents a monovalent cation and $M^{II}$ represents a divalent cation; and said separate, water soluble transition metal compound is present in the mixture in an amount such that the molar ratio of the HSM to the transition metal component of the separate, water soluble transition metal compound is from 3000:1 to 1:1.

2. The oxygen scavenger of claim 1 wherein said separate, water soluble transition metal compound has a transition metal selected from Sc, Ti, V, Cr, Mn, Fe, Co, Ni, Sn, Cu or mixtures thereof.

3. The oxygen scavenger of claim 1 wherein the separate, water soluble transition metal compound has a transition metal selected from Co, Cu, Fe or mixtures thereof.

4. The oxygen scavenger of claim 1 wherein $M^{I}$ is selected from $Li^+$, $Na^+$, $K^+$, $NH_4^+$ or $NR_4^+$ wherein each R independently is selected from hydrogen, $C_1$–$C_3$ alkyl or aryl group.

5. The oxygen scavenger of claim 1 wherein $M^{II}$ is selected from $Ca^{2+}$, $Mg^{2+}$, $Mn^{2+}$, $Zn^{2+}$, $Fe^{2+}$, $Co^{2+}$, $Ni^{2+}$, $Cu^{2+}$ or mixtures thereof.

6. A method of scavenging oxygen from the interior atmosphere of a closed container comprising contacting moisture in the presence of the oxygen of said atmosphere to an oxygen scavenger comprising a mixture of hydroxosulfitometalate and a separate, water soluble transition metal compound, said separate, water soluble transition metal compound having a transition metal component and said hydroxosulfitometalate (HSM) comprising between 0.05 and 90 weight percent of said mixture and represented by the formula:

$$M^{I}M^{II}{}_2OH(SO_3)_2 \cdot H_2O$$

wherein $M^{I}$ represents a monovalent cation and $M^{II}$ represents a divalent cation; and said separate, water soluble transition metal compound is present in the mixture in an amount such that the molar ratio of the HSM to the transition metal component of the separate, water soluble transition metal compound is from 3000:1 to 1:1.

7. A container having an interior cavity suitable to contain an oxygen sensitive material which has, as at least a part of the container and exposed to the interior of said container, an oxygen scavenger comprising a mixture of hydroxosulfitometalate and a separate, water soluble transition metal compound, said separate, water soluble transition metal compound having a transition metal component and said hydroxosulfitometalate (HSM) comprising between 0.05 and 90 weight percent of said mixture and represented by the formula:

$$M^{I}M^{II}{}_2OH(SO_3)_2 \cdot H_2O$$

wherein $M^{I}$ represents a monovalent cation and $M^{II}$ represents a divalent cation; and said separate, water soluble transition metal compound is present in the mixture in an amount such that the molar ratio of the HSM to the transition metal component of the separate, water soluble transition metal compound is from 3000:1 to 1:1.

8. An oxygen scavenger comprising a mixture of:
a) a hydroxosulfitometalate having a first surface area; and
b) a separate, water soluble transition metal compound, said transition metal compound having a transition metal component, disposed on the first surface area of the hydroxosulfitometalate,
wherein said hydroxosulfitometalate is represented by the formula:

$$M^{I}M^{II}{}_2OH(SO_3)_2 \cdot H_2O$$

wherein $M^{I}$ represents a monovalent cation and $M^{II}$ represents a divalent cation; and wherein said separate, water soluble transition metal compound is present in the mixture in an amount such that the molar ratio of the HSM to the transition metal component of the separate, water soluble transition metal compound is from 3000:1 to 1:1.

9. The oxygen scavenger of claim 8 wherein said hydroxosulfitometalate (HSM) comprises between 0.05 and 90 weight percent of said mixture.

10. The oxygen scavenger of claim 8 wherein said separate, water soluble transition metal compound has a transition metal selected from Sc, Ti, V, Cr, Mn, Fe, Co, Ni, Sn, Cu or mixtures thereof.

11. The oxygen scavenger of claim 8 wherein $M^{I}$ is selected from $Li^+$, $Na^+$, $K^+$, $NH_4^+$ or $NR_4^+$ wherein each R independently is selected from hydrogen, $C_1$–$C_3$ alkyl or aryl group.

12. The oxygen scavenger of claim 8 wherein $M^{II}$ is selected from $Ca^{2+}$, $Mg^{2+}$, $Mn^{2+}$, $Zn^{2+}$, $Fe^{2+}$, $Co^{2+}$, $Ni^{2+}$, $Cu^{2+}$ or mixtures thereof.

13. The oxygen scavenger of claim 8 wherein the separate, water soluble transition metal compound is disposed as a coating on the first surface area of the hydroxosulfitometalate.

14. A sachet comprising a mixture of:
a) hydroxosulfitometalate, and
b) a separate, water soluble transition metal compound, said separate, water soluble transition metal compound having a transition metal component:
wherein said hydroxosulfitometalate (HSM) comprises between 0.05 and 90 weight percent of said mixture, and is represented by the formula:

$M^I M^{II}{}_2 OH(SO_3)_2 \cdot H_2O$ wherein $M^I$ represents a monovalent cation and $M^{II}$ represents a divalent cation; and wherein said separate, water soluble transition metal compound is present in the mixture in an amount such that the molar ratio of the HSM to the transition metal component of the separate, water soluble transition metal compound is from 3000:1 to 1:1.

15. The mixture of claim 14 wherein said hydroxosulfitometalate (HSM) comprises between 0.05 and 90 weight percent of said mixture.

16. The mixture of claim 14 wherein said separate, water soluble transition metal compound has a transition metal selected from So, Ti, V, Cr, Mn, Fe, Co, Ni, Sn, Cu or mixtures thereof.

17. The mixture of claim 14 wherein $M^I$ is selected from $Li^+$, $Na^+$, $K^+$, $NH_4^+$ or $NR_4^+$ wherein each R independently is selected from hydrogen, $C_1$–$C_3$ alkyl or aryl group.

18. The mixture claim 14 wherein $M^{II}$ is selected from $Ca^{2+}$, $Mg^{2+}$, $Mn^{2+}$, $Zn^{2+}$, $Fe^{2+}$, $Co^{2+}$, $Ni^{2+}$, $Cu^{2+}$ or mixtures thereof.

19. A carrier comprising:
a) a polymeric matrix, and
b) a mixture, distributed in the polymeric matrix, comprising
i) hydroxosulfitometalate, and
ii) a separate, water soluble transition metal compound, said separate, water soluble transition metal compound having a transition metal component;
wherein said hydroxosulfitometalate (HSM) comprises between 0.05 and 90 weight percent of said mixture, and is represented by the formula:

$M^I M^{II}{}_2 OH(SO_3)_2 \cdot H_2O$ wherein $M^I$ represents a monovalent cation and $M^{II}$ represents a divalent cation; and wherein said separate, water soluble transition metal compound is present in the mixture in an amount such that the molar ratio of the HSM to the transition metal component of the separate, water soluble transition metal compound is from 3000:1 to 1:1.

20. The mixture of claim 19 wherein said hydroxosulfitometalate (HSM) comprises between 0.05 and 90 weight percent of said mixture.

21. The mixture of claim 19 wherein said separate, water soluble transition metal compound has a transition metal selected from Sc, Ti, V, Cr, Mn, Fe, Co, Ni, Sn, Cu or mixtures thereof.

22. The mixture of claim 19 wherein $M^I$ is selected from $Li^{30}$, $Na^+$, $K^+$, $NH_4^+$ or $NR_4^+$ wherein each R independently is selected from hydrogen, $C_1$–$C_3$ alkyl or aryl group.

23. The mixture of claim 19 wherein $M^{II}$ is selected from $Ca^{2+}$, $Mg^{2+}$, $Mn^{2+}$, $Zn^{2+}$, $Fe^{2+}$, $Co^{2+}$, $Ni^{2+}$, $Cu^{2+}$ or mixtures thereof.

24. The carrier of claim 19 wherein the polymeric matrix is in the form of a film, dispersion, latex, plastisol, dry blend, solution, or melt.

25. The carrier of claim 19 wherein the polymeric matrix is a material selected from the group consisting of polyolefin, vinyl polymer, polyether, polyester, polyamide, phenol-formaldehyde condensation polymer, polysiloxane, ionic polymer, polyurethane, acrylic, cellulose, tannin, polysaccharide, and starch.

* * * * *